United States Patent [19]
Romesburg

[11] Patent Number: 5,299,525
[45] Date of Patent: Apr. 5, 1994

[54] APPARATUS FOR SUPPORTING FLAGS ON AUTOMOBILE ANTENNAS

[76] Inventor: Daniel R. Romesburg, 1816 Rebecca Rd., Lutz, Fla. 33549

[21] Appl. No.: 42,734

[22] Filed: Apr. 5, 1993

[51] Int. Cl.$^5$ ............................................. G09F 17/00
[52] U.S. Cl. .................................. 116/173; 116/28 R
[58] Field of Search .............. 116/173, 174, 28 R, 116/209; 40/218, 334, 591, 592, 603, 604, 607, 611; 248/231, 511

[56] References Cited

U.S. PATENT DOCUMENTS

| | | | |
|---|---|---|---|
| 2,905,140 | 9/1959 | Acklam | 116/173 |
| 2,909,147 | 10/1959 | Crowder | 116/173 |
| 3,219,010 | 11/1965 | Hyatt | 116/173 |
| 3,732,845 | 5/1973 | Istre | 116/173 |

FOREIGN PATENT DOCUMENTS

| | | | |
|---|---|---|---|
| 0505675 | 9/1951 | Belgium | 116/173 |
| 0002457 | of 1856 | United Kingdom | 116/173 |

*Primary Examiner*—William A. Cuchlinski, Jr.
*Assistant Examiner*—W. Morris Worth
*Attorney, Agent, or Firm*—Michael J. Colitz, Jr.

[57] ABSTRACT

A system for removably displaying preselected indicia, the system comprising, a tubular support, the tubular support having an interior diameter and an exterior diameter and a length whereby when positioned over an antenna, the upper edge of the support will be located immediately beneath the enlargement at the upper end of the antenna for minimizing the chance of inadvertent lifting of the support from the antenna; and a pair of clips, each clip having an exterior portion and an interior portion coupled with respect to the support, the exterior portion including a two components, one component being resiliently urged into contact with the other to form a closed loop but movably away to create an opening therebetween; and a plurality of flags individually removably coupleable to the post, each flag including a sheet having indicia thereon and a periphery, an essentially rigid support structure secured within at least a portion of the periphery adapted to maintain the sheet in a predetermined orientation, and a pair of rigid grommets coupled with respect to the support structure to create an integral support assembly therewith, the grommets being formed with apertures and located whereby any flag may be removably attached to the post.

11 Claims, 2 Drawing Sheets

APPARATUS FOR SUPPORTING FLAGS ON AUTOMOBILE ANTENNAS

BACKGROUND OF THE INVENTION

1. Field of the Invention

This invention relates to apparatus for supporting flags on automobile antennas and, more particularly, to indicia bearing flags and tubular supports in systems configurations wherein the tubular supports are removably positionable over antennas of automobiles and indicia bearing flags are selectively coupleable to the supports.

2. Description of the Background Art

Freedom of speech today takes many forms. One very popular form is in signs and flags on personal vehicles such as automobiles, trucks and the like. Such signs most commonly take the form of bumper stickers which make an expression of the owner's viewpoint on one matter or another. Such flags commonly include indicia such as writing, colors or drawings expressing the owner's preference for one particular sports team or another.

Many types of flags and devices for supporting flags, particularly on vehicle antennas, are known and are in wide use today. Typical examples of such flags and supports are described in the patent literature. Note for example, U.S. Pat. Nos. 4,601,255 and 4,875,431 to Marcotti and Dobosz, respectively. These patents disclose flags releasably supported on upstanding rods such as vehicle antennas. These patents, however, require resilient components. By their very nature, resilient components have limited lives since resilience is normally lost through use or over simply the lives of the resilient devices.

U.S. Pat. Nos. 4,519,153 to Moon and 4,650,147 to Griffin disclose flags and supports removably mountable with respect to automobiles. Such supports of the disclosed devices are of non-tubular configurations, employ excessive materials for their purposes and are not suitable for mounting on antennas because of their complex designs.

Additional devices designed for attachment to antennas and the like are disclosed by Faragosa in U.S. Pat. No. 3,712,263; by Henry in U.S. Pat. No. 4,964,360 and by Liming in U.S. Pat. No. 4,989,563. Faragosa employs a complex support which is large and expensive and which has no provision for flag replacement. Henry employs a complex mechanism for attachment to an antenna with no flag or flag attachment structures used in association therewith. Liming employs a structure attachable over the upper end of an antenna requiring parts of complex shapes which add to the cost and, like Henry, there is no flag or flag attachment structures used in association therewith. As can be readily understood that there is nothing in the prior art which describes or suggests apparatus for supporting flags on automobile antennas wherein the flags are removably attachable to supports which, in turn, are readily mountable on automobile antennas in an efficient, convenient and economical manner as described herein.

Accordingly, it is an object of the present invention to provide an improved system for removably displaying preselected indicia, the system comprising, a tubular support, the tubular support having an interior diameter and an exterior diameter and a length whereby when positioned over an antenna, the upper edge of the support will be located immediately beneath the enlargement at the upper end of the antenna for minimizing the chance of inadvertent lifting of the support from the antenna; and a pair of clips, each clip having an exterior portion and an interior portion coupled with respect to the support, the exterior portion including a two components, one component being resiliently urged into contact with the other to form a closed loop but movably away to create an opening therebetween; and a plurality of flags individually removably coupleable to the post, each flag including a sheet having indicia thereon and a periphery, an essentially rigid support structure secured within at least a portion of the periphery adapted to maintain the sheet in a predetermined orientation, and a pair of rigid grommets coupled with respect to the support structure to create an integral support assembly therewith, the grommets being formed with apertures and located whereby any flag may be removably attached to the post.

A further object of the present invention is to mount and remove a support with respect to an automobile antenna, with or without a flag attached to the support, in a convenient manner.

A further object of the present invention is to utilize the enlarged end tip of a vehicle antenna to securely retain a tubular support in position over the antenna during movement of the vehicle.

A further object of the present invention is to selectively attach one of a plurality of indicia-bearing flags on a tubular support positionable on an antenna.

A further object of the present invention is to maintain an indicia-bearing flag in an unfurled orientation through a peripheral support structure.

A further object of the invention is to secure a support assembly, grommets and a peripheral structure, with respect to a flag to extend the utility of the flag.

These objects should be construed to be merely illustrative of some of the more prominent features and applications of the intended invention. Many other beneficial results can be obtained by applying the disclosed invention in a different manner or by modifying the invention within the scope of the disclosure. Accordingly, other objects and a more comprehensive understanding of the invention may be obtained by referring to the summary of the invention, and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purposes of summarizing the invention, the invention may be incorporated into an improved device for supporting a flag from the antenna of an automobile, the antenna being of the type having an elongated generally cylindrical section extending upwardly from the automobile with an enlargement at the upper end, the device comprising, a tubular support molded of polypropylene, the tubular support having an interior cylindrical bore having a diameter of about ⅜ inches and an exterior cylindrical surface having a diameter of about ½ inches and a length of about 29 inches, whereby when positioned over the antenna of an automobile with the antenna within the interior bore, and with the lower edge of the support resting on a portion of the automobile, then the upper edge will be located immediately beneath the enlargement at the upper end of the antenna for minimizing the change of inadvertent lifting of the support from the antenna; and a pair of clips molded of polypropylene, each clip having an exterior portion and having an interior portion integrally molded with the support at spaced locations adjacent to the upper edge of the support, the exterior portion including a J-shaped component and a linear component, the linear component being resiliently urged into contact with the J-shaped portion to form a closed loop for receipt of a grommet but movably away from the J-shaped portion to create an opening therebetween for the passage of a grommet therethrough.

The invention may also be incorporated into an improved device for supporting a flag from an antenna, the device comprising, a tubular support, the tubular support having an interior diameter and an exterior diameter and a length whereby when positioned over an antenna, the upper edge of the support will be located immediately beneath the enlargement at the upper end of the antenna for minimizing the chance of inadvertent lifting of the support form the antenna; and a pair of clips, each clip having an exterior portion and an interior portion coupled with respect to the support, the exterior portion including a two components, one component being resiliently urged into contact with the other to form a closed loop but movable away to create an opening therebetween.

The tubular support and clips are integrally molded of an elastomeric material. Such material is preferably polypropylene.

The invention may also be incorporated into a flag removably coupleable to spaced clips on a tubular post supportable by the antenna of an automobile, the flag including, a flexible sheet having indicia thereon and a periphery, the sheet also having a seam formed along at least the majority of the periphery; an essentially rigid support structure secured within at least the majority of the seam, the support structure adapted to maintain the sheet in a predetermined orientation; and a pair of rigid grommets secured to the sheet adjacent to a common edge of the sheet and attached to the support structure to create an integral support assembly therewith, the grommets being formed with apertures and located in space relationships from each other whereby the flag may be removably attached to the post through clips formed in the post.

The invention may also be incorporated into a flag removably coupleable to a post the flag including, a sheet having a periphery; an essentially rigid support structure secured within at least a portion of the periphery adapted to maintain the sheet in a predetermined orientation; and a pair of rigid grommets coupled with respect to the support structure to create an integral support assembly therewith, the grommets being formed with apertures and located whereby the flag may be removably attached to the post.

Each grommet is of a two piece construction snapped together on opposite sides of the sheet. The flag is preferably rectangular and the rigid support extends essentially entirely around the periphery. The flag may also be a banner or pennant.

The invention may also be incorporated into a system for removably displaying preselected indicia, the system comprising, a tubular support, the tubular support having an interior diameter and an exterior diameter and a length whereby when positioned over an antenna, the upper edge of the support will be located immediately beneath the enlargement at the upper end of the antenna for minimizing the chance of inadvertent lifting of the support from the antenna; and a pair of clips, each clip having an exterior portion and an interior portion coupled with respect to the support, the exterior portion including a two components, one component being resiliently urged into contact with the other to form a closed loop but movably away to create an opening therebetween; and a plurality of flags individually removably coupleable to the post, each flag including a sheet having indicia thereon and a periphery, an essentially rigid support structure secured within at least a portion of the periphery adapted to maintain the sheet in a predetermined orientation, and a pair of rigid grommets coupled with respect to the support structure to create an integral support assembly therewith, the grommets being formed with apertures and located whereby any flag may be removably attached to the post.

The foregoing has outlined rather broadly, the more pertinent and important features of the present invention. The detailed description of the invention that follows is offered so that the present contribution to the art may be more fully appreciated. Additional features of the invention will be described herein. These form the subject of the claims of the invention. It should be appreciated by those skilled in the art that the conception and the disclosed specific embodiment may be readily utilized as a basis for modifying or designing other structures for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

For a more succinct understanding of the nature and objects of the invention, reference should be directed to the following description taken in conjunction with the accompanying drawings in which.

Similar reference numerals refer to similar parts throughout the several Figures.

DETAILED DESCRIPTION OF THE PREFERRED EMBODIMENT OF THE INVENTION

Figure 1:
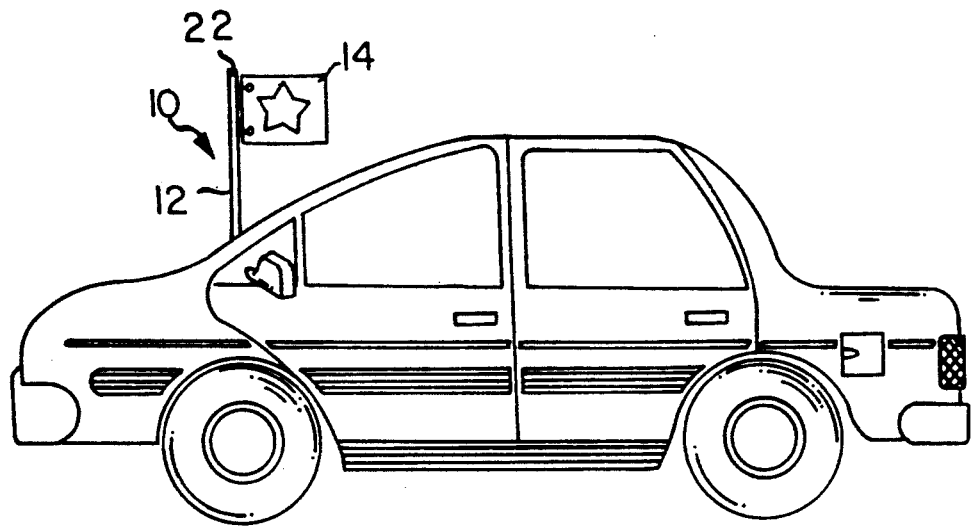
FIG. 1 is an illustration of an automobile with the primary embodiment flag and flag supporting apparatus constructed in accordance with the principles of the present invention.
Figure 4:
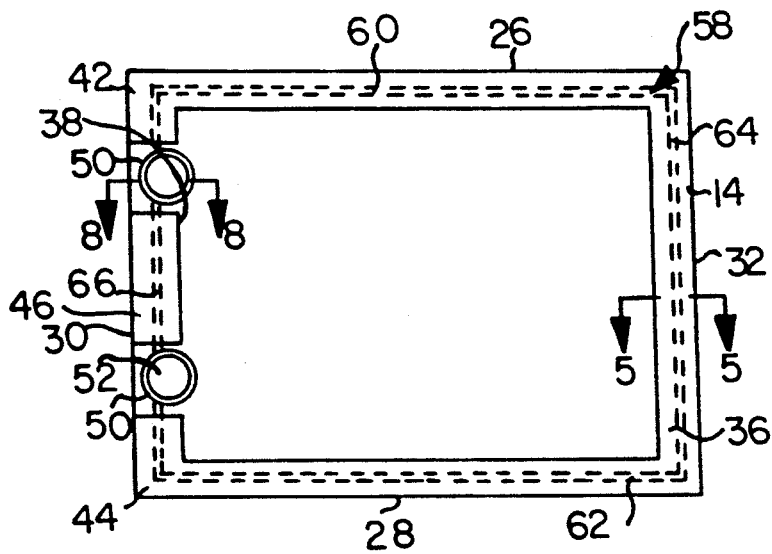
FIG. 4 is an elevational view of the flag as shown in FIG. 1.
Figure 5:
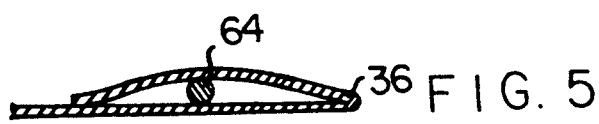
FIG. 5 is a sectional view taken along line 5—5 of FIG. 4.
Figure 7:
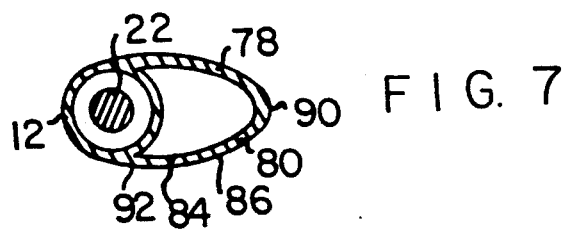
FIG. 7 is a sectional view of the antenna and flag supporting mechanism taken along line 7—7 of FIG. 6.

With particular reference to FIG. 1, there is shown a system 10 constructed in accordance with principles of the present invention. This system includes a tubular support 12 for supporting a flag as well as the flag 14 itself. The flag as shown in FIGS. 1, 4 and 5 is of a generally conventional design having a length slightly greater than the height. The shape of the flag is not of great significance since it could take any of a plurality of conventional shapes such as the banner 16 of FIG. 2 or the pennant 18 of FIG. 3. The flag may be of a one piece design without indicia thereon except for a significant color or colors. The flag, however, may be formed with a symbol (FIG. 1) as indicia representing a particular sports team or the like. The flag may take the shape of the banner (FIG. 2) suspended from a rear antenna of an automobile. In that case the banner might be of a different design and with simply a color coding as indicia of the supported team. Lastly, the flag may take the shape of a pennant with a letter, word or words (FIG. 3) representing the team to be supported. The pennant of FIG. 3 is shown as coupled with a angled antenna on the automobile. Any type of indicia may be used on any type of flag and any type of flag may be flown on any type of automobile antenna 22. In the preferred mode, any support post for a flag may be provided with a plurality of flags for a particular sporting event, events, or the like.

Shown in FIG. 4 is the flag 14 of FIG. 1. It includes a pair of spaced parallel upper and lower edges 22 and 28 and spaced parallel front and rear edges 30 and 32 in a rectangular configuration. Around the majority of the periphery of the flag is a seam 36 with its free edge in-turned and coupled to an interior portion of the flag material at a seam 38. The present flag is of a elastomeric material wherein the edge of the periphery is heat sealed to the central portion to form a hem. The heat seal could be replaced with stitching or both could be used. The stitching is the preferred mode for flags of cloth fabrics.

Figure 8:
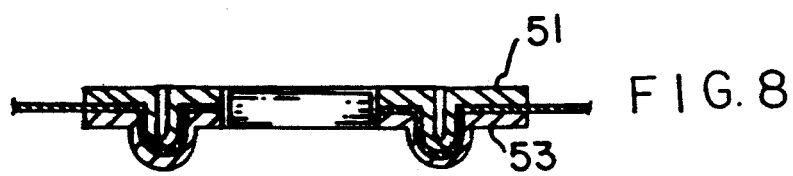
FIG. 8 is a sectional view of the grommet taken along line 8—8 of FIG. 4.
Figure 6:
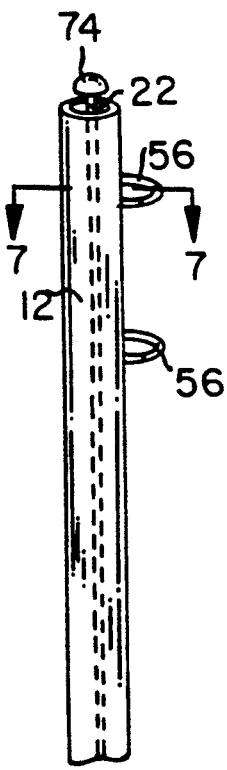
FIG. 6 is an enlarged showing of the antenna of FIGS. 1, 2 or 3.

Located adjacent to the interior at a vertical edge of the flag, the seam is formed of three separate sections; an upper section 42, lower section 44 and intermediate section 46 therebetween. This provides for a pair of unseamed edges whereat rigid grommets 50 of a rigid material, plastic or metal, are utilized. The grommets are preferably formed as conventional two-component 51 and 53, members, one above the flag material and one below, which snap together with the material secured therebetween. Note FIG. 8. The grommets allow a hole 52 to be firmly formed through the grommets and flag for coupling to clips 56 of the support post 12.

The grommets 50 are coupled to a generally rectangular support frame 58 having upper and lower horizontal rod portions 60 and 62, and extended vertical rod portion 64 coupled thereto and, at the interior edge, a short rod portion 66 between and coupled to the grommets. The support rods and grommets together make a rigid frame 58 located within the seam for supporting the flag in an erect, unfurled orientation when in use whether the post and car to which it is attached are in motion.

Figure 2:
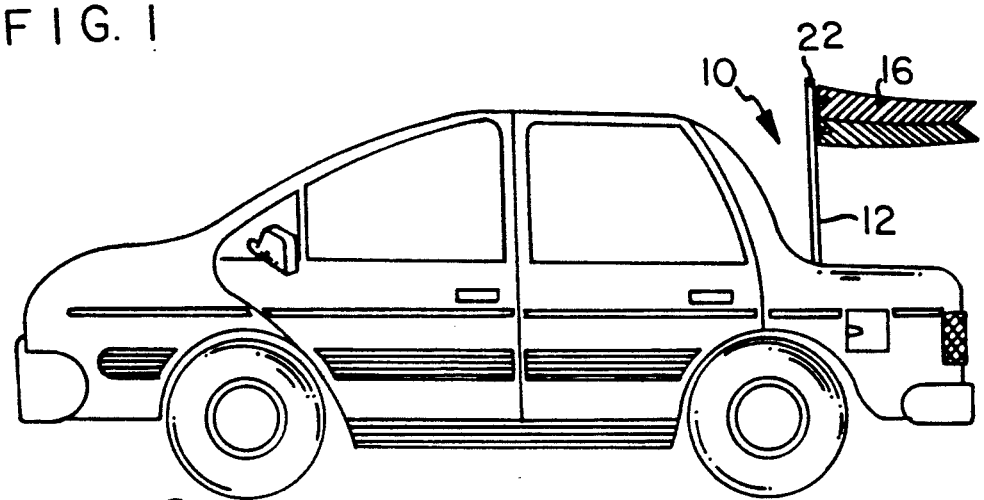
FIGS. 2 and 3 show automobiles similar to FIG. 1 but with flags constructed in accordance with alternate embodiments of the present invention.
Figure 3:
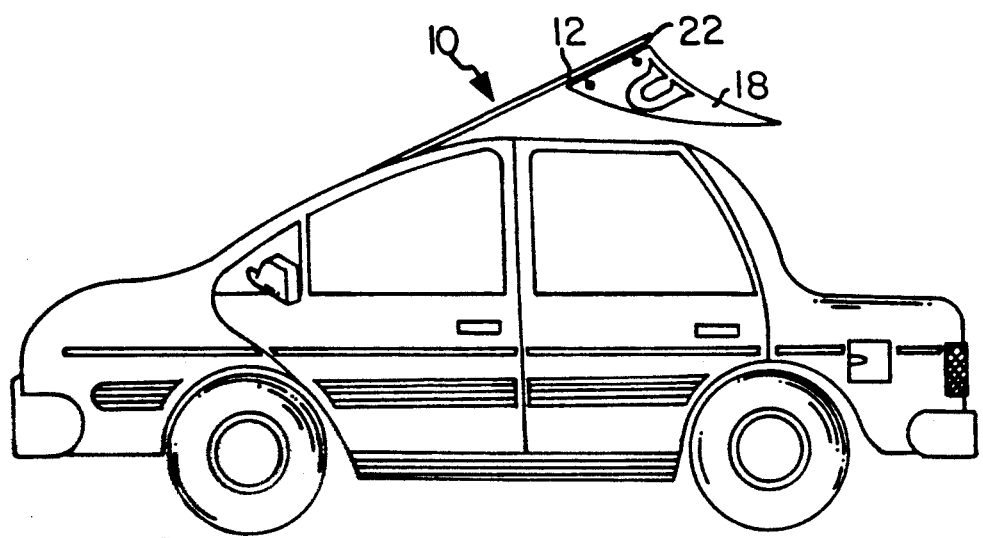

It should be understood that the support frame need not be rectangular but may take the triangular configuration as shown in FIG. 3 or the more complex configuration corresponding to the banner of FIG. 2. In all instances, however, the grommets and support are of a rigid configuration corresponding to the periphery of the flag being supported. In all configurations, the vertical edge adjacent the interior end is provided with the grommets spaced for coupling with the support post clips. The preferred rigid material for the support material is plastic, a rigid plastic such as polypropylene, polyethylene, polyvinyl chloride, or the like. Metallic components as of aluminum, steel or the like could likewise be utilized.

The second component of the system is the support post 12 with clips 56. This is preferably of a one piece construction and includes a tube 12 adapted to be slid over the antenna 22 of an automobile. The exterior diameter is essentially of a right circular cylinder throughout as is the interior diameter. The exterior diameter is about ⅜ inches while the interior diameter is about ¼ inches. This allows for a wall thickness of about ⅛ inches. The interior diameter is such that it is readily slid over the antenna of an automobile or removed. Storage is convenient into the trunk of a car or any other location.

Antennas are normally formed of a diameter of about ⅛ inches. They are normally formed at their upper end with an enlargement ball 74 having a diameter of about ¼ inches. In this manner the support post may be readily slid in position over the antenna of the car and removed without excess of manual dexterity. An antenna is normally about 30 inches in length. Consequently, the support post is about 29 inches in length. This allows for the tip of the antenna to extend upwardly from the upper edge of the tip post while the lower edge of the post is supported on the automobile. In this manner, when in place, the post will rest along its length in line contact with one edge of the antenna. The upper projection at the upper edge of the antenna will, consequently, function as a bearing surface to preclude the post and flag from flying upwardly off the antenna when in use. These numbers relating to sizes and dimensions are by example only for the preferred embodiment. Variations are within the purview of the invention.

Also as part of the post, preferably integrally formed therewith, are a pair of clips 56. The clips are formed into the post adjacent to the upper end of the support post and spaced along the length a distance corresponding to the spacing between the center of the grommets. Each clip has a major portion 78 in a J-shaped configuration, with a free edge 80 facing toward the antenna. Each clip also has a linear portion 84 with a free edge 86 facing away from the antenna and in contact with the free edge of the J-shaped portion. The linear portion is spring urged into contact with the end of the J-shaped portion with the adjacent surfaces at an angle with respect to each other. The exterior end 90 of each clip extends horizontally away from the axis of the post with the interior end 92 molded integrally with the post.

In use, the operator may readily depress the linear portion 84 inwardly to provide an opening through which the grommets 52 may pass for mounting or unmounting a flag in the space between the portions of the clip. In this manner, any of a plurality of the flags may be placed on the antenna with minimum inconvenience and negligible manual dexterity by the user.

The present disclosure includes that contained in the appended claims as well as that of the foregoing description. Although this invention has been described in its preferred form with a certain degree of particularity, it should be understood that the present disclosure of the preferred form has been made only by way of example and that numerous changes in the details of construction and combination and arrangement of parts may be resorted to without departing from the spirit and scope of the invention.

Now that the invention has been described,
What is claimed is:

1. A device for supporting a flag from an automobile antenna having an elongated generally cylindrical section extending upwardly from the automobile with an enlargement at an upper end, the device consisting of:

an elongated tubular support with an upper edge and a lower edge molded of polypropylene, the tubular support having an interior cylindrical bore having a diameter of about ⅜ inches and an exterior cylindrical surface having a diameter of about ⅞ inches and a length of between about 29 inches, the size of the support being such that when positioned over an antenna of an automobile with an antenna within the interior bore, and with the lower edge of the supporting resting on a portion of an automobile, then the upper edge of the support is located immediately beneath an enlargement at an upper end of an antenna for minimizing the chance of inadvertent lifting of the support from an antenna; and a pair of clips molded of polypropylene, each clip having an exterior portion and having an interior portion integrally molded with the support at spaced locations adjacent to the upper edge of the support, the exterior portion including a J-shaped component and a linear component, the linear component being resiliently urged into contact with the J-shaped portion to form a closed loop for receipt of a grommet but movable away from the J-shaped portion to create an opening therebetween for the passage of a grommet therethrough, the clips being located in the upper half of the support.

2. A device for supporting a flag from an antenna having an upper end and a lower end, the device consisting of:

an elongated tubular support having an upper edge and a lower edge, the tubular support having an interior diameter and an exterior diameter and a length such that when positioned over an antenna, the upper edge of the support is located immediately beneath an enlargement at an upper end of an antenna for minimizing the chance of inadvertent lifting of the support from an antenna; and a pair of clips, each clip having an exterior portion and an interior portion coupled with respect to the support, the exterior portion including two components, one component being resiliently urged into contact with the other component to form a closed loop but movable away to create an opening therebetween, the clips being located in the upper half of the support.

3. The device as set forth in claim 2 wherein the tubular support and clips are integrally molded on an elastomeric material.

4. The device as set forth in claim 3 wherein the elastomeric material is polypropylene.

5. The device as set forth in claim 2 and further including a flag removably coupleable to the clips, the flag including:

a flexible sheet having indicia thereon and a periphery, the sheet also having a seam formed along at least the majority of the periphery;

an essentially rigid support structure secured within at least the majority of the seam, the support structure adapted to maintain the sheet in a predetermined orientation; and a pair of rigid grommets secured to the sheet adjacent to a common edge of the sheet and attached to the support structure to create an integral support assembly therewith, the grommets being formed with apertures and located in spaced relationships from each other such that the flag may be removably attached to the clips.

6. The device as set forth in claim 2 and further including a flag removably coupleable to the clips, the flag including:

a sheet having a periphery;

an essentially rigid support structure secured within at least a portion of the periphery adapted to maintain the sheet in a predetermined orientation; and a pair of rigid grommets coupled with respect to the support structure to create an integral support assembly therewith, the grommets being formed with apertures and located whereby the flag may be removably attached to the post.

7. The device as set forth in claim 6 wherein each grommet is of a two piece construction snapped together in opposite sides of the sheet.

8. The device as set forth in claim 6 wherein the flag is rectangular and the rigid support extends essentially entirely around the periphery.

9. The device as set forth in claim 6 wherein the flag is a banner.

10. The device as set forth in claim 6 wherein the flag is a pennant.

11. A system for removably displaying preselected indicia, the system consisting:

a tubular support, the tubular support having an upper edge and a lower edge and an interior diameter and an exterior and a length such that when positioned over an antenna, the upper edge of the support is located immediately beneath an enlargement at the upper end of an antenna for minimizing the chance of inadvertent lifting of the support from an antenna; and a pair of clips, each clip having an exterior portion and an interior portion coupled with respect to the support, the exterior portion including two components, one component being resiliently urged into contact with the other component to form a closed loop but movably away to create an opening therebetween, the clips being located in the upper half of the support; and a plurality of flags individually removably coupleable to the clips, each flag including a sheet having indicia thereon and a periphery, an essentially rigid support structure secured within at least a portion of the periphery adapted to maintain the sheet in a predetermined orientation, and a pair of rigid grommets coupled with respect to the support structure to create an integral support assembly therewith, the grommets being formed with apertures and located whereby any flag of the plurality of flags may be removably attached to the clips.

* * * * *